(12) United States Patent
Kao et al.

(10) Patent No.: US 8,411,226 B2
(45) Date of Patent: Apr. 2, 2013

(54) FLAT PANEL DISPLAY HAVING INTEGRAL HOUSING

(75) Inventors: Lien-Te Kao, Hsinchu County (TW); Hung-Yu Pan, Hsinchu County (TW); Chi-Yeh Lu, Hsinchu County (JP); Ching-Fu Hsu, New Taipei (TW); Tzu-Wei Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 224 days.

(21) Appl. No.: 12/952,126

(22) Filed: Nov. 22, 2010

(65) Prior Publication Data
US 2012/0092813 A1    Apr. 19, 2012

(30) Foreign Application Priority Data
Oct. 14, 2010    (TW) ............................. 99135035 A (51) Int. Cl.
*G02F 1/1333*    (2006.01)

(52) U.S. Cl. .......................................... 349/58; 362/632

(58) Field of Classification Search .................. 349/58, 349/65; 362/97.1, 97.2, 632–634, 612; 361/679.01
See application file for complete search history.

(56) References Cited

U.S. PATENT DOCUMENTS
7,760,289 B2 *    7/2010    Nakanishi et al. .............. 349/60

* cited by examiner

*Primary Examiner* — Thoi Duong
(74) *Attorney, Agent, or Firm* — Winston Hsu; Scott Margo (57) ABSTRACT

In a flat panel display having a first housing and a second housing, features of a frame and a plastic support and a top support, which support, position, and fix each component, are incorporated into the outer top and bottom case, such that no additional structure component is needed for the flat panel display. The first housing has supportive parts and side portions for assembling and supporting each component of the flat panel display and the second housing is then assembled to the first housing for completion of the assembling of the flat panel display.

13 Claims, 11 Drawing Sheets

FLAT PANEL DISPLAY HAVING INTEGRAL HOUSING

BACKGROUND OF THE INVENTION

1. Field of the Invention

The invention relates to a flat panel display, and more particularly, to a flat panel display having integral housing.

2. Description of the Prior Art

Conventional flat panel displays need frame structure to protect the backlight module and each components of the panel, such as a light emitting diodes source, a light guide plate, optical films, prism film, cell . . . etc. After each component is assembled together in the frame structure to be a panel module in panel factory, the panel module is then transported to a system factory for assembling with outermost housings, generally including a top housing and a bottom housing. The top housing and the bottom housing assembled in the system factory usually serve as protection and ornamentation for the panel module, not having any supportive function to the structure of the panel module.

Figure 1:
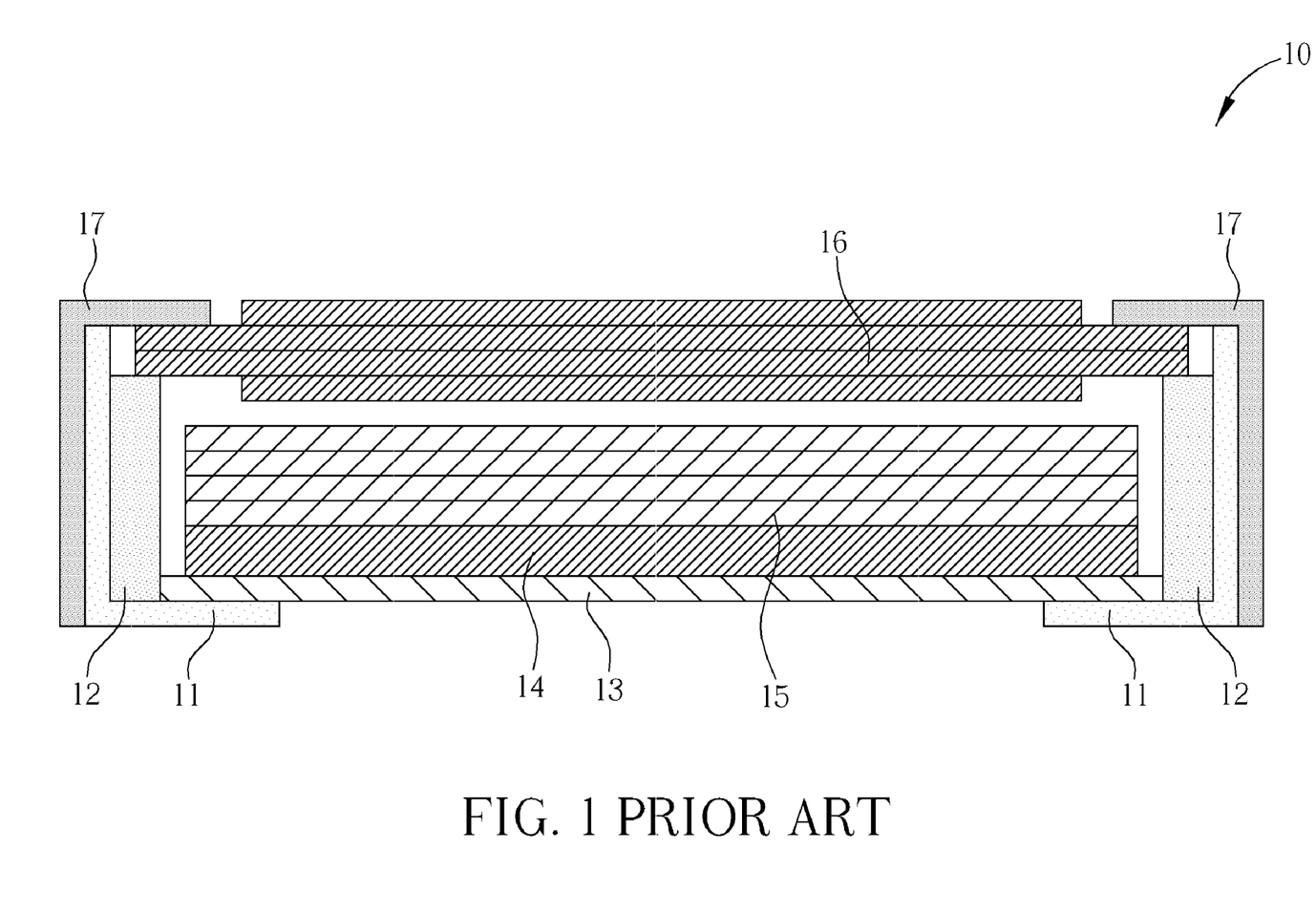
FIG. 1 is a schematic diagram showing a non light source side assembly of a panel module according to the prior art.
Figure 2:
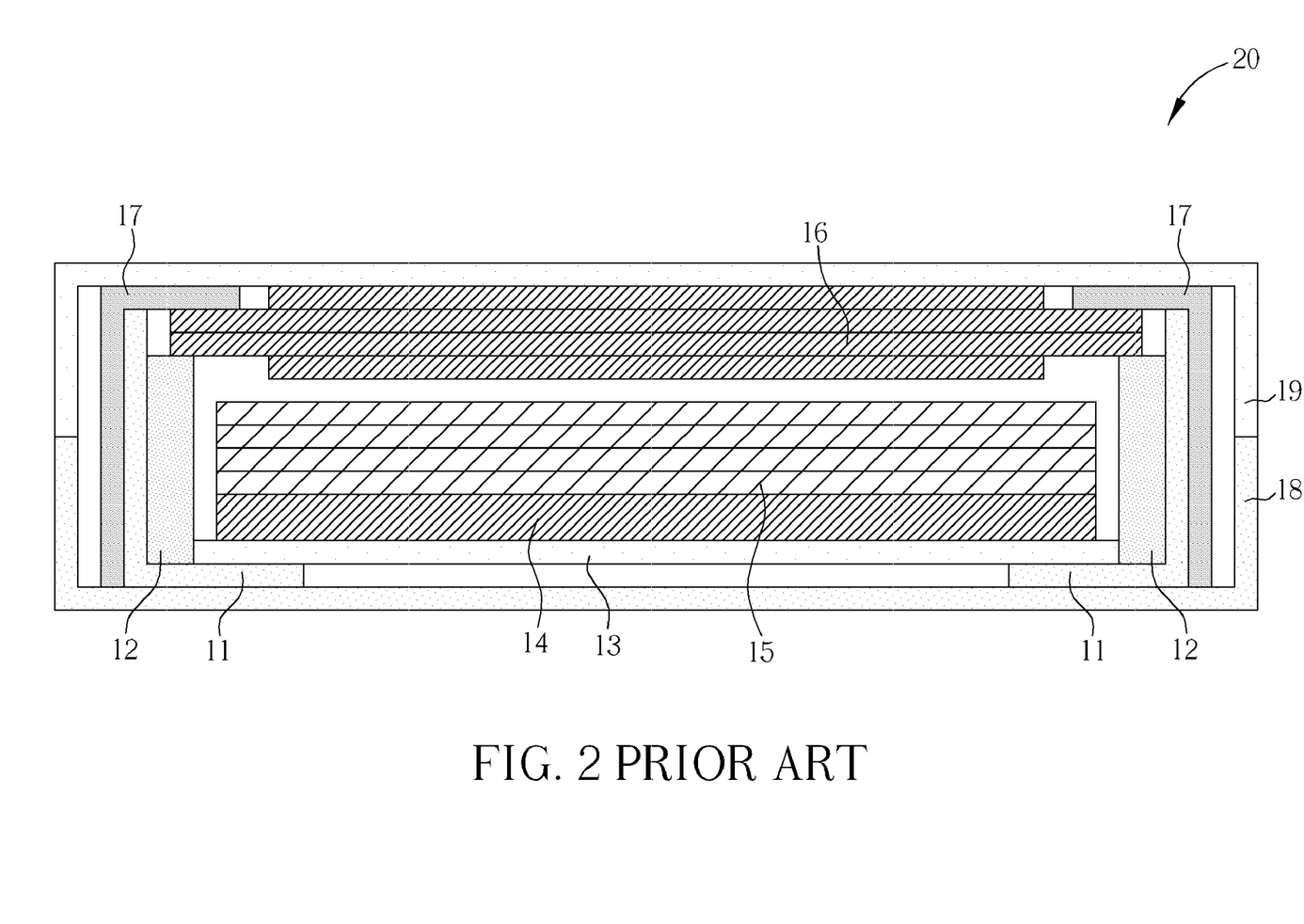
FIG. 2 is a schematic diagram of the flat panel display in FIG. 1 with top and bottom housings.
Figure 3:
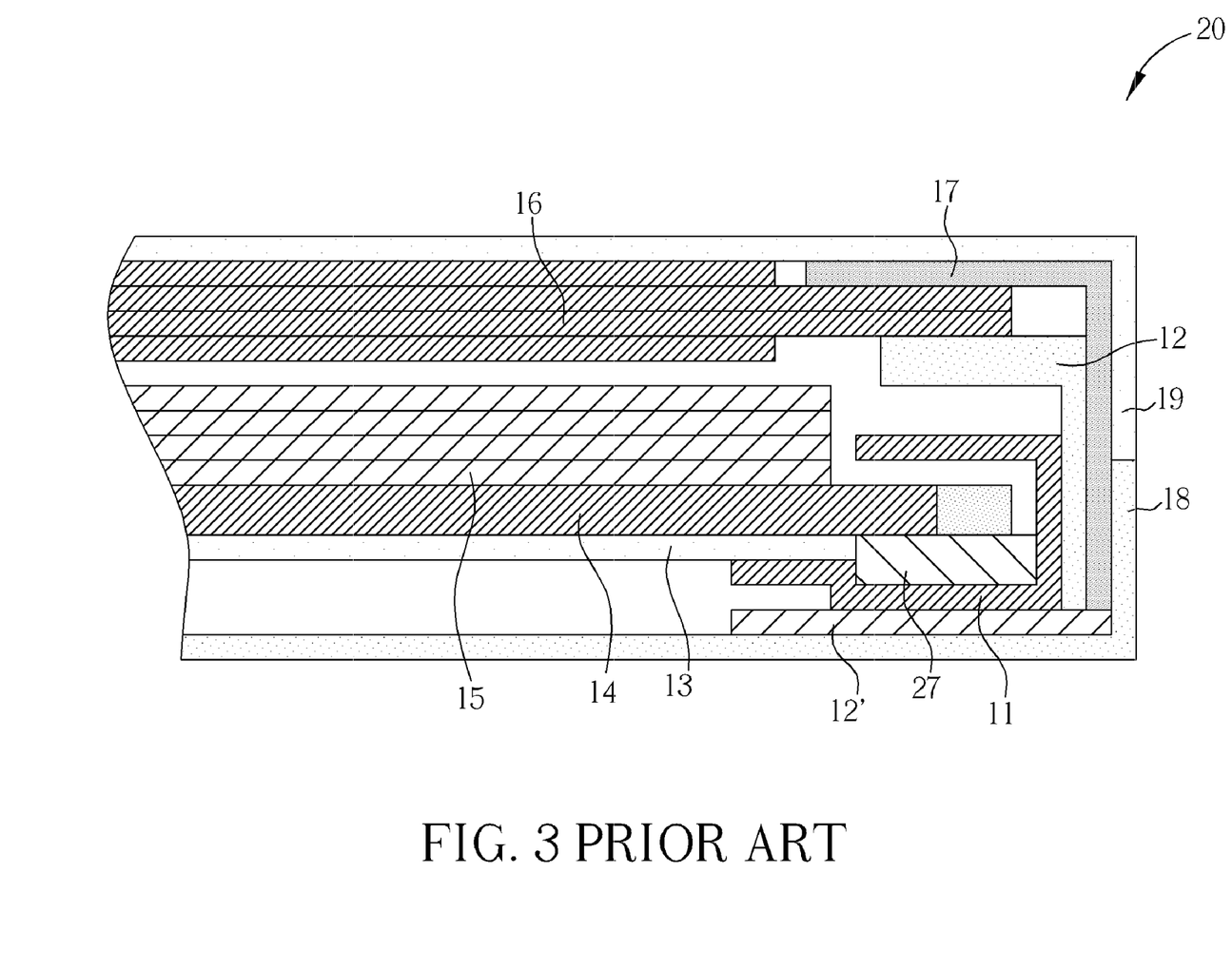
FIG. 3 is a schematic diagram of the flat panel display in FIG. 2 showing a light source side.

Please refer to FIG. 1. FIG. 1 is a schematic diagram showing a non light source side assembly of a panel module 10 according to the prior art. The panel module 10 takes a frame structure 11 as the main supportive structure. Inside the frame structure 11, a plastic support 12 is assembled first, then a reflector 13, a light guide plate 14, and optical films 15 are placed thereon in order, and a cell 16 is then mounted to the plastic support 12. Finally, a top frame 17 is fixed to the frame structure 11 and the cell 16 in order to fix and protect the cell 16. After the assembling of the panel module 10 shown in FIG. 1 is completed, a top housing 19 and a bottom housing 18 are assembled to the panel module 10 as ornamental components as shown in FIG. 2. FIG. 3 shows a schematic diagram of the flat panel display in FIG. 2 showing a light source side. A backlight unit 27 at the light source side is fixed inside the frame structure 11, whereas an additional plastic support 12' should be added between the frame structure 11 and the bottom housing 18 to provide proper support. It is obvious, by referring to FIG. 1 to FIG. 2, that such way of assembling of a flat panel display has higher cost of design and components, and also increases the cost in package and transportation.

SUMMARY OF THE INVENTION

The invention provides a flat panel display having integral housing. The flat panel display includes a first housing, a reflector, a backlight unit, a light guide plate, an optical film, a cell, a top frame, and a second housing. The first housing includes a first supportive part, a second supportive part, a first side portion, and a second side portion. The reflector, the backlight unit, the light guide plate, and the optical film stack on the first supportive part in order. The cell is placed on the second supportive part. The top frame is mounted to the cell and the first side portion for fixing the cell. The second housing includes a third side portion. The second housing covers on the perimeter of the cell and is mounted to the first housing via the third side portion assembling to the second side portion.

The invention also provides a flat panel display having integral housing. The flat panel display includes a first housing, a reflector, a backlight unit, a light guide plate, an optical film, a cell, and a second housing. The first housing includes a first supportive part, a second supportive part, a first side portion, and a second side portion. The reflector, the backlight unit, the light guide plate, and the optical film stack on the first supportive part in order. The cell is placed on the second supportive part. The second housing includes a frame portion and a third side portion. The second housing covers on the perimeter of the cell. The frame portion is mounted to the cell and the first side portion for fixing the cell. The second housing is mounted to the first housing via the third side portion assembling to the second side portion.

The invention also provides a bottom housing of a flat panel display. The bottom housing includes a first supportive part, a second supportive part, a first side portion, and a second side portion. The first supportive part is utilized for supporting a reflector, a backlight unit, a light guide plate, and an optical film of the flat panel display. The second supportive part is utilized for supporting a cell of the flat panel display. The first side portion is utilized for fixing a top frame of the flat panel display. The second side portion is utilized for assembling to a top housing of the flat panel display.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
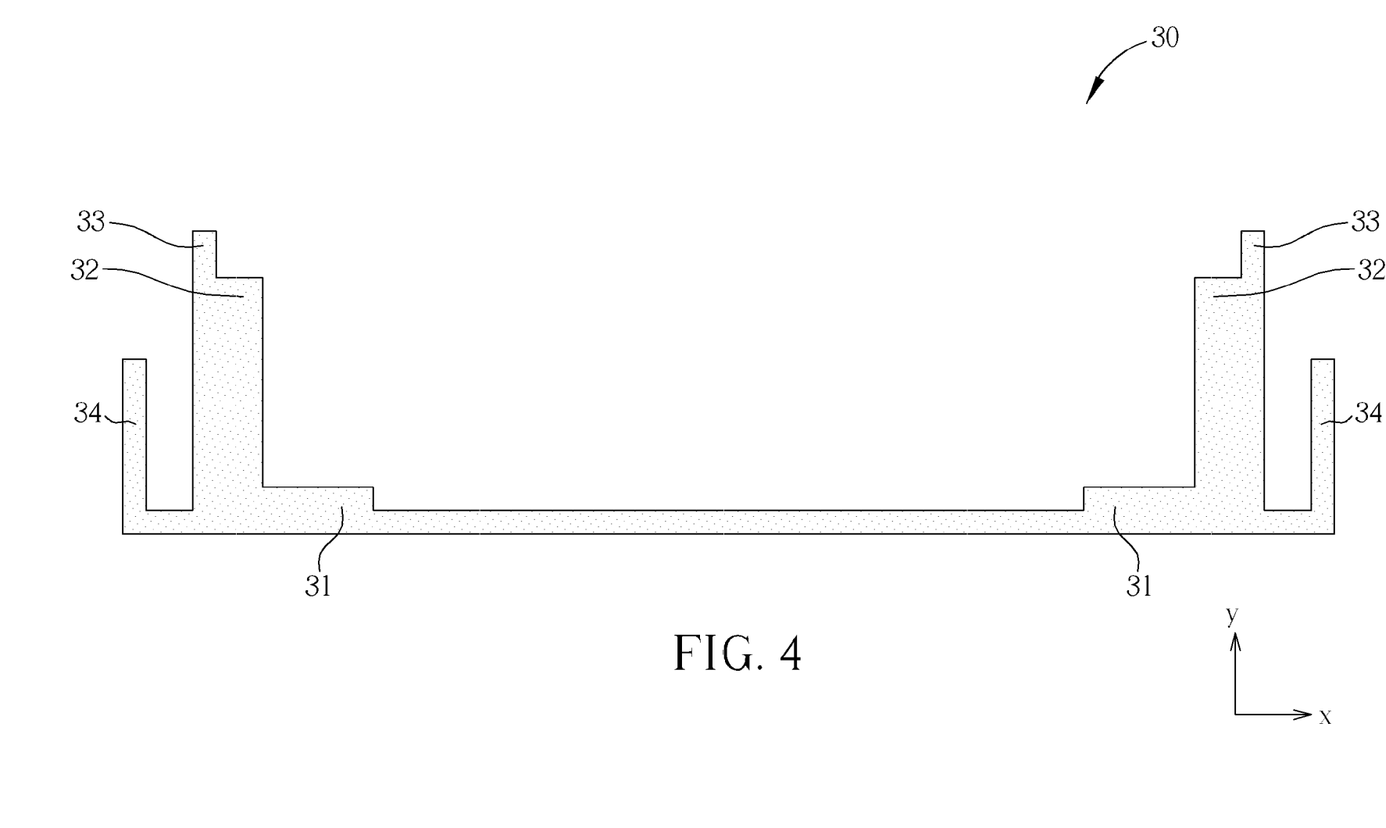
FIG. 4 is a schematic diagram of a first housing showing a non light source side according to the invention.

The invention reduces the number of components and cost of a flat panel display, such as the display for the upper part over the hinge of a notebook, by using a first housing in replace of the frame and the plastic support of the display. Please refer to FIG. 4. FIG. 4 is a schematic diagram of a first housing 30 showing a non light source side according to the invention. The first housing 30 is monolithical structure made of polycarbonate (PC), mixture of polycarbonate and acrylonitrile butadiene styrene (ABS), metal, or materials utilized for injection molding, and is used as the housing and inner supportive structure of a flat panel display. The first housing 30 includes a first supportive part 31, a second supportive part 32, a first side portion 33, and a second side portion 34. In the embodiment of the invention, the first supportive part 31 and the second supportive part 32 have an orientation along the x direction, or the horizontal direction, in the figure to provide excellent support for the components of the flat panel display. The first side portion 33 and the second side portion 34 have an orientation along the y direction, or the vertical direction, in the figure to be assembled to other components. The shape of the first housing 30 in the figure only reveals a preferred embodiment disclosed in the invention, which should not be a limit, and any first housing 30 that has features aforementioned should be included in the scope of the invention.

Figure 5:
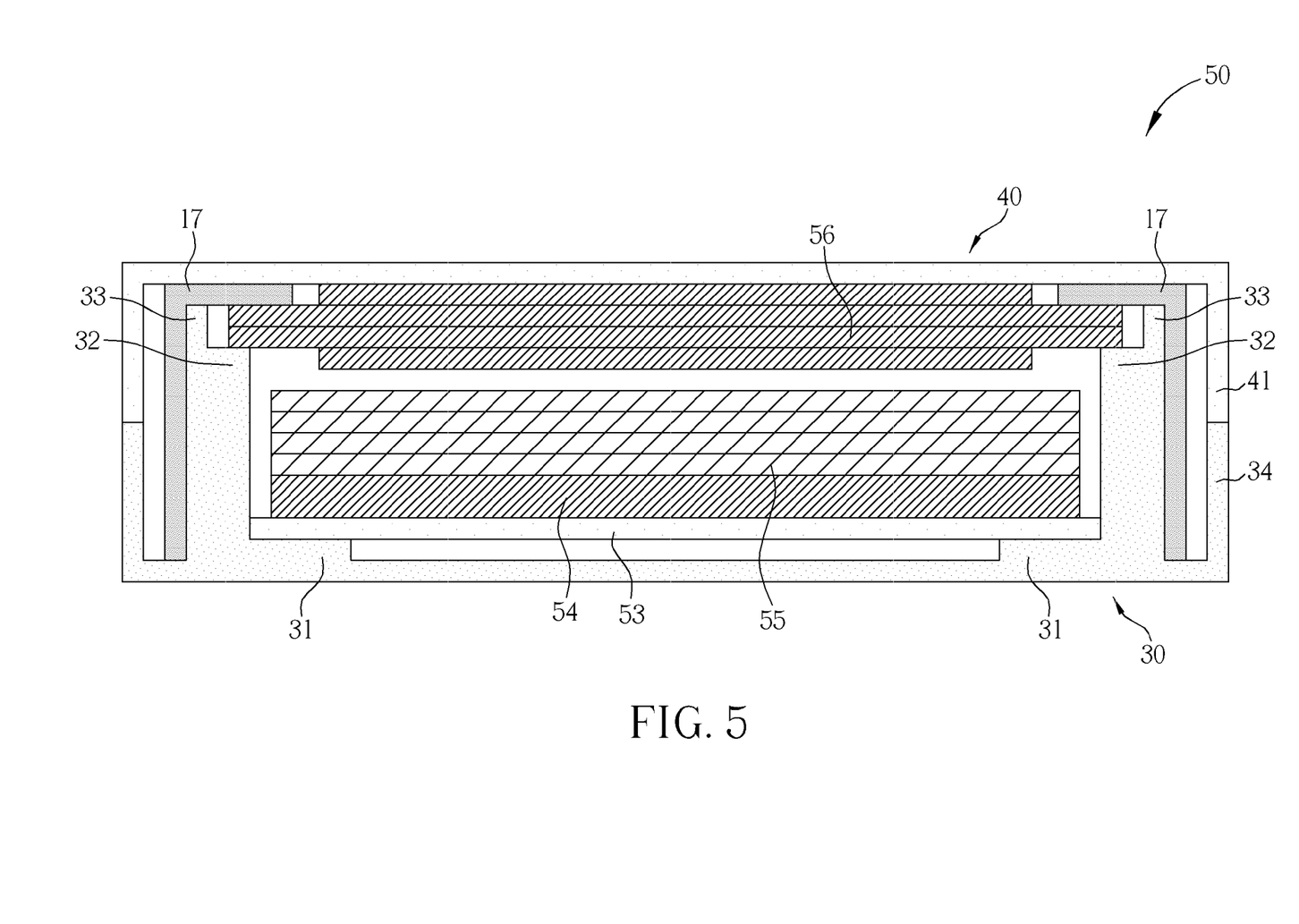
FIG. 5 is a schematic diagram of a first embodiment of a flat panel display showing a non light source side according to the invention.

Please refer to FIG. 5, which is a schematic diagram of a first embodiment of a flat panel display 50 showing a non light source side according to the invention. In addition to the first housing 30, or the bottom housing, described in FIG. 4, the flat panel display also includes a reflector 53, a backlight unit (such as the backlight unit 57, 77 in FIG. 8~11), a light guide plate 54, a plurality of optical films 55, and a cell 56. During the assembling process, the reflector 53, the backlight unit and the light guide plate 54, the optical films 55 stack vertically downward, or the reverse direction along the y axis in FIG. 4, on the first supportive part 31 of the first housing 30 in order, and the cell 56 is then vertically placed downward on the second supportive part 32. A top frame 17 of the flat panel display 50 is then mounted to the cell 56 and the first side portion 33 of the first housing 30, so as to fix and protect the cell 56. Finally, a second housing 40, or a top housing, of the flat panel display 50 is put vertically downward to cover the perimeter of the cell 56 and is mounted and assembled to the first housing 30 by using a third side portion 41 of the second housing 40, also vertically oriented, assembling to the second side portion 34 of the first housing 30, so as to complete the assembling process of the flat panel display 50. With the specially designed first housing 30 of the invention, each component of the flat panel display 50 mentioned above can be directly and completely assembled in a single plant, saving cost of the assembling process and the package and transportation between different plants.

Figure 6:
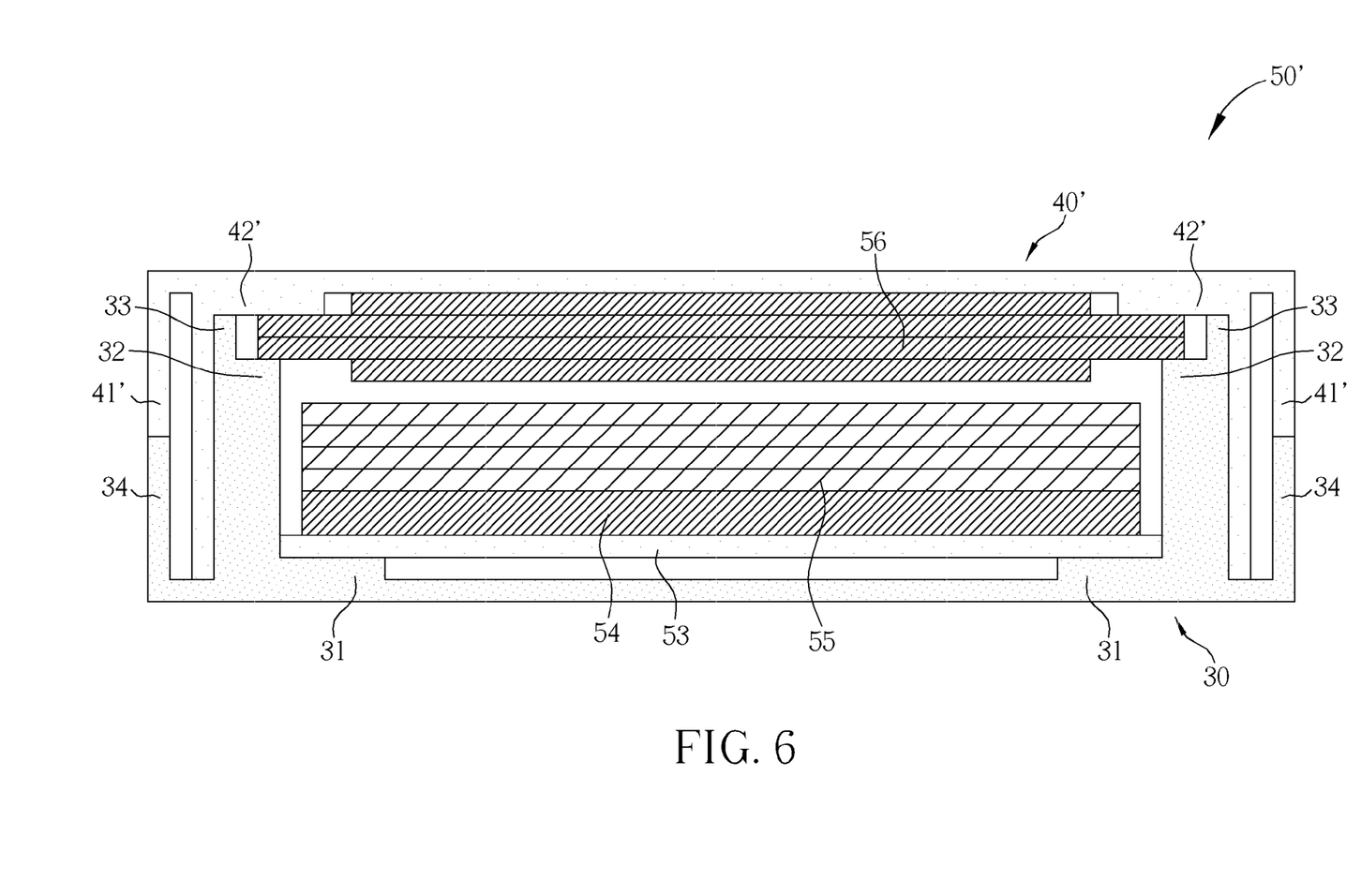
FIG. 6 is a schematic diagram of a second embodiment of the flat panel display showing a non light source side according to the invention.

Please refer to FIG. 6. FIG. 6 is a schematic diagram of a second embodiment of a flat panel display 50' showing a non light source side according to the invention. In addition to the integral type first housing 30 described in the first embodiment, the second housing 40 of the flat panel display 50 in the first embodiment can further integrate the top frame 17, and these two components can be incorporated together as an integral structure, too. As shown in the second embodiment, a second housing 40' of the flat panel display 50' includes a third side portion 41' and a frame portion 42'. After the second housing 40' vertically covering the perimeter of the cell 56, the frame portion 42' of the second housing 40' can be mounted to the cell 56 and be assembled to the first side portion 33 of the first housing 30, such that the second housing 40' can fix and protect the cell 56. The third side portion 41' of the second housing 40' is assembled to the second side portion 34, such that the second housing 40' is also mounted and assembled to the first housing 30.

Likewise, the second housing 40 or the second housing 40' in these embodiments are monolithical structure made of polycarbonate (PC), mixture of polycarbonate and acrylonitrile butadiene styrene (ABS), metal, or materials utilized for injection molding.

Figure 7:
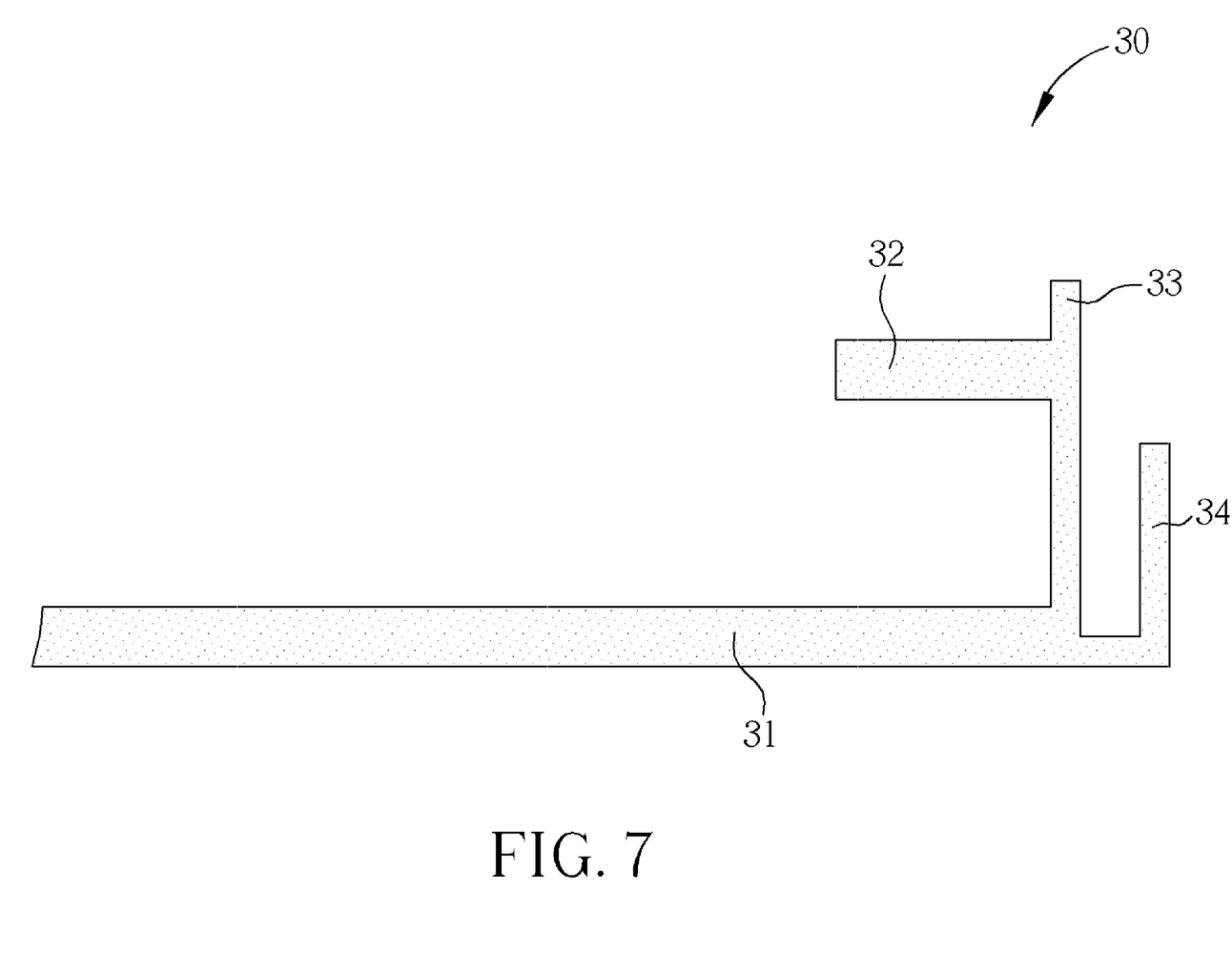
FIG. 7 is a schematic diagram of the first housing in FIG. 4 showing a light source side.

Please refer to FIG. 7, which is a schematic diagram of the first housing 30 in FIG. 4 showing a light source side. The first supportive part 31 and the second supportive part 32 of the first housing 30 have alternative shapes at the light source side in order to correspond to the backlight unit at the light source side. Still, the shapes illustrated in the figure are not limitation of the invention.

Figure 8:
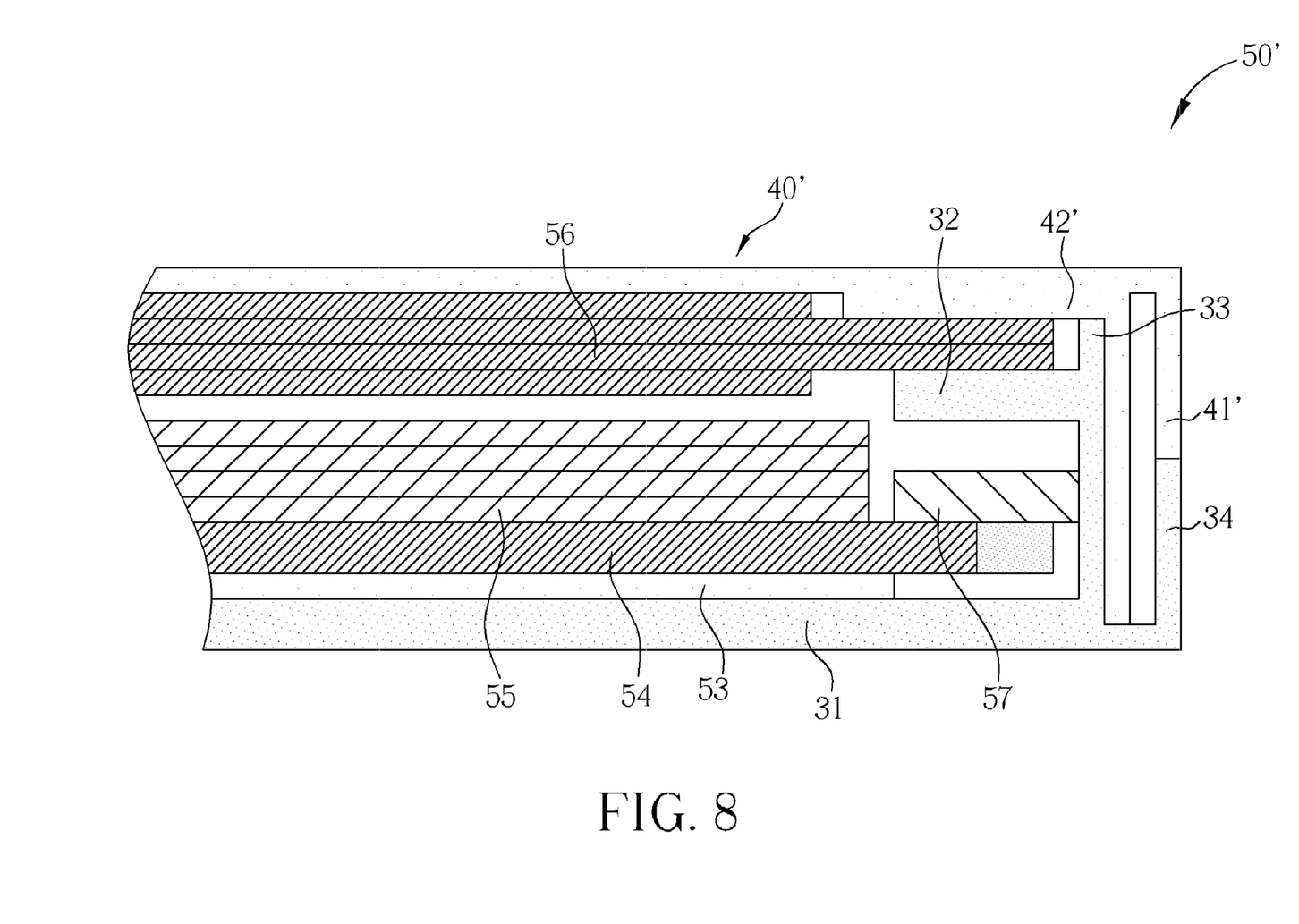
FIG. 8 is a schematic diagram of the second embodiment in FIG. 6 showing a light source side.
Figure 9:
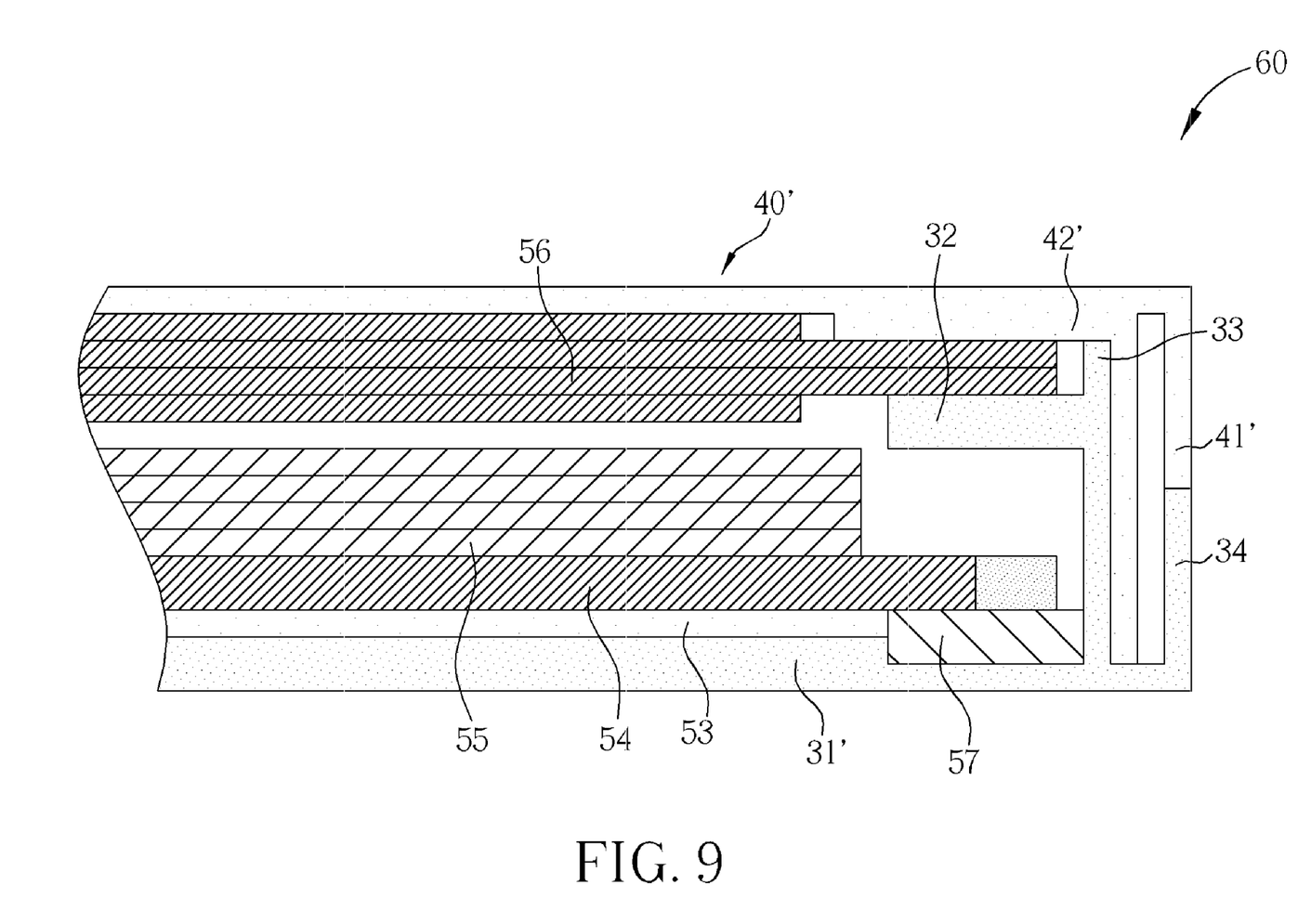
FIG. 9 is a schematic diagram of a third embodiment of the flat panel display showing a light source side.
Figure 10:
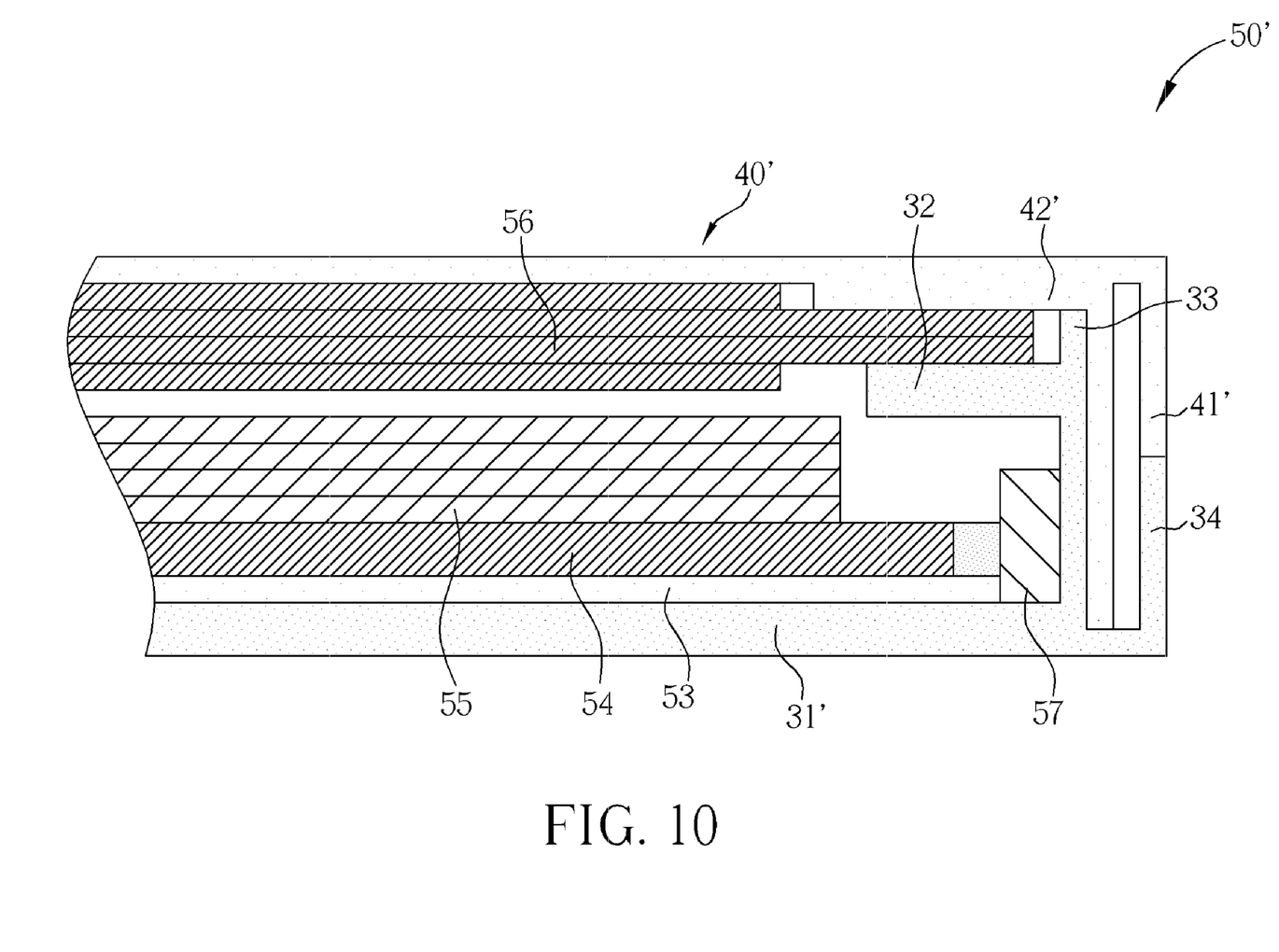
FIG. 10 is a schematic diagram of a fourth embodiment of the flat panel display showing a light source side.

Please refer to FIG. 8 to FIG. 10, which are schematic diagrams of various embodiments of the flat panel display showing a light source side. The flat panel display 50' include a side-type backlight unit 57, light emitting diodes for example, that is configured at a side of the display. The backlight unit 57 is shown as a second embodiment in FIG. 8, which is configured upside down at a side of the light guide plate 54, or is shown as a third embodiment in FIG. 9, which is configured up straight at the side of the light guide plate 54 and inside the first housing 31', or is shown as a fourth embodiment in FIG. 10, which is configured laterally facing the side of the light guide plate 54.

Figure 11:
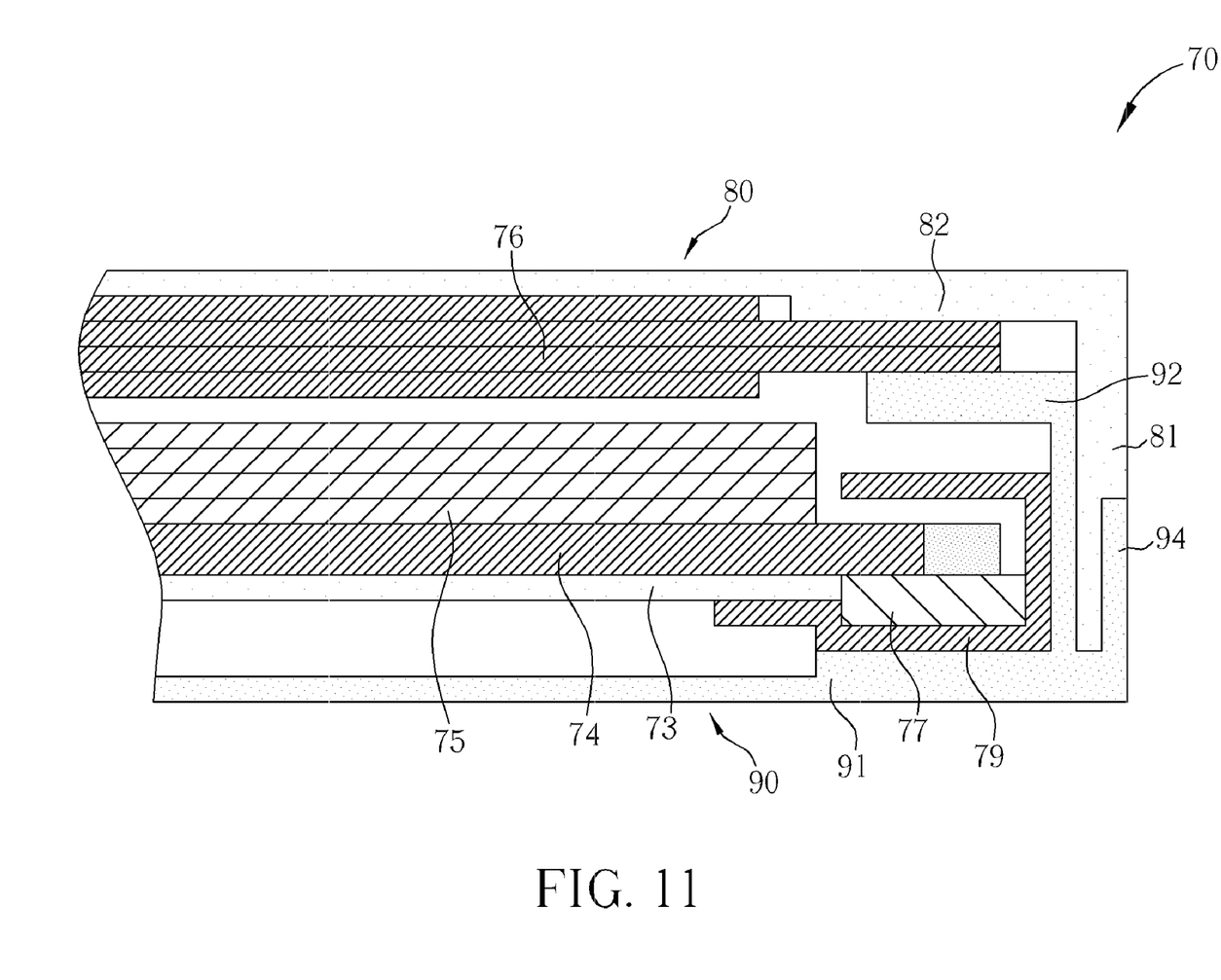
FIG. 11 is a schematic diagram of a fifth embodiment of the flat panel display showing a light source side.

Please refer to FIG. 11. FIG. 11 is a schematic diagram of a fifth embodiment of the flat panel display 70 showing a light source side. The flat panel display 70 includes a first housing 90, a reflector 73, a light guide plate 74, a plurality of optical films 75, a cell 76, and a second housing 80. The first supportive part 91, the second supportive part 92, the first side portion 93, and the second side portion 94 of the first housing 90, and the third side portion 81 and the frame portion 82 of the second housing 80 are substantially similar as the previous embodiments. In the fifth embodiment, please also referring to the prior art embodiment showing in FIG. 3, the backlight unit 77 at the light source side is fixed inside a source frame 79, which is properly supported by the first supportive part 91 of the first housing 90. Hence, compared to the embodiment in FIG. 3, the flat panel display 70 in the fifth embodiment can further remove the plastic support 12' and reduce the number of components of the flat panel display 70.

In the flat panel display having the first housing and the second housing, features of a frame and a plastic support and a top support, which support, position, and fix each component, are incorporated into the outer top and bottom case, such that no additional structure component is needed for the flat panel display. The first housing has supportive parts and side portions for assembling and supporting each component of the flat panel display and the second housing is then assembled to the first housing for completion of the assembling of the flat panel display.

Those skilled in the art will readily observe that numerous modifications and alterations of the device and method may be made while retaining the teachings of the invention.

What is claimed is:

1. A flat panel display having integral housing, comprising:
   a first housing, comprising a first supportive part, a second supportive part, a first side portion, and a second side portion;
   a reflector directly mounted on the first supportive part;
   a backlight unit, a light guide plate, and an optical film stacking on the reflector in order;
   a cell, placed on the second supportive part;
   a top frame, mounted to the cell and the first side portion for fixing the cell; and
   a second housing, comprising a third side portion, the second housing covering on the perimeter of the cell and mounted to the first housing via the third side portion assembling to the second side portion;
   wherein each of the first housing and the second housing is a monolithical component.

2. The flat panel display of claim 1, wherein each of the first housing and the second housing is made of polycarbonate (PC), mixture of polycarbonate and acrylonitrile butadiene styrene (ABS), metal, or materials utilized for injection molding.

3. The flat panel display of claim 1, wherein the reflector, the light guide plate, and the optical film stack on the first supportive part in order along a first direction, the cell is placed on the second supportive part along the first direction, and the first side portion and the second side portion of the first housing have the orientation of the first direction.

4. The flat panel display of claim 1, wherein the backlight unit is light emitting diodes configured at a side of the light guide plate.

5. The flat panel display of claim 4, further comprising a source frame supported on the first supportive part at a light source side of the flat panel display, wherein the backlight unit is fixed inside the source frame.

6. A flat panel display having integral housing, comprising:
a first housing, comprising a first supportive part, a second supportive part, a first side portion, and a second side portion;
a reflector directly mounted on the first supportive part;
a backlight unit, a light guide plate, and an optical film stacking on the reflector in order;
a cell, placed on the second supportive part; and
a second housing, comprising a frame portion and a third side portion, the second housing covering on the perimeter of the cell, the frame portion mounted to the cell and the first side portion for fixing the cell, and the second housing mounted to the first housing via the third side portion assembling to the second side portion;
wherein each of the first housing and the second housing is a monolithical component.

7. The flat panel display of claim 6, wherein each of the first housing and the second housing is made of polycarbonate (PC), mixture of polycarbonate and acrylonitrile butadiene styrene (ABS), metal, or materials utilized for injection molding.

8. The flat panel display of claim 6, wherein the reflector, the light guide plate, and the optical film stack on the first supportive part in order along a first direction, the cell is placed on the second supportive part along the first direction, and the first side portion and the second side portion of the first housing have the orientation of the first direction.

9. The flat panel display of claim 6, wherein the backlight unit is light emitting diodes configured at a side of the light guide plate.

10. The flat panel display of claim 9, further comprising a source frame supported on the first supportive part at a light source side of the flat panel display, wherein the backlight unit is fixed inside the source frame.

11. A bottom housing of a flat panel display, comprising a first supportive part, a second supportive part, a first side portion, and a second side portion formed as a monolithical component, a reflector directly mounted on the first supportive part, the first supportive part for supporting the reflector, a backlight unit, a light guide plate, and an optical film of the flat panel display, the second supportive part for supporting a cell of the flat panel display, the first side portion for fixing a top frame of the flat panel display, and the second side portion for assembling to a top housing of the flat panel display.

12. The bottom housing of claim 11, wherein the bottom housing is made of polycarbonate (PC), mixture of polycarbonate and acrylonitrile butadiene styrene (ABS), metal, or materials utilized for injection molding.

13. The bottom housing of claim 11, wherein the reflector, the light guide plate, and the optical film stack on the first supportive part in order along a first direction, the cell is placed on the second supportive part along the first direction, the first side portion and the second side portion have the orientation of the first direction, and the first supportive part and the second supportive part have the orientation perpendicular to the first direction.

* * * * *